United States Patent [19]

Inaba et al.

[11] Patent Number: 4,630,101
[45] Date of Patent: Dec. 16, 1986

[54] CHROMAKEY SIGNAL PRODUCING APPARATUS

[75] Inventors: Masao Inaba; Hiroshi Takahashi, both of Tokyo, Japan

[73] Assignee: NEC Corporation, Japan

[21] Appl. No.: 543,111

[22] Filed: Oct. 18, 1983

[30] Foreign Application Priority Data

Oct. 18, 1982 [JP]  Japan ............................. 57-182344

[51] Int. Cl.$^4$ ............................................. H04N 9/74
[52] U.S. Cl. ....................................... 358/22; 358/183
[58] Field of Search ................................... 358/22, 183

[56] References Cited

U.S. PATENT DOCUMENTS 4,506,289  3/1985  Shirakami ........................... 358/22

FOREIGN PATENT DOCUMENTS 0042283  3/1982  Japan .................................... 358/22

Primary Examiner—James J. Groody
Assistant Examiner—Michael R. Dunnam
Attorney, Agent, or Firm—Ostrolenk, Faber, Gerb & Soffen

[57] ABSTRACT

A chromakey signal producing apparatus is disclosed. A color to be keyed is set as a first reference color and a color not to be keyed is set as a second reference color. A clear chromakey signal is automatically produced by discriminating the difference between the first and second reference colors. According to the invention, even when a part of the TV picture has a color similar to that of the part to be keyed, a clearly discriminated chromakey signal is produced without the need for any complicated sensitivity factor judgment, simply by designating the color of that particular part as the second reference color corresponding to the maximum sensitivity.

6 Claims, 3 Drawing Figures

CHROMAKEY SIGNAL PRODUCING APPARATUS

BACKGROUND OF THE INVENTION

The present invention relates to a chromakey signal producing apparatus used for making montage pictures in TV program production, and more particulary to a line chromakey producing apparatus for producing a chromakey signal directly from an NTSC composite video signal.

Recently, an apparatus for producing a chromakey signal directly from a composite video signal, rather than from red (R), green (G) and blue (B) components, has been developed. In the prior art apparatus, a chromakey signal is produced by extracting Y, I and Q components from an incoming digital composite video signal, computing the differences between these components and corresponding Y, I and Q components of a set color (reference color) which is to be keyed, and multiplying the respective differences thus computed by sensitivity factors. In other words, only one reference color, i.e., one set of Y, I and Q components is designated as a key-color in the prior art. This prior art apparatus can generate a clear chromakey signal only when the incoming digital video signal has chrominance or luminance sufficiently distinguishable from the reference color in an area except the chromakey area. However, it is difficult to generate a clear chromakey signal when the incoming digital video signal has a color similar to the reference color in an area other than the chromakey area. Consequently, in the prior art, compensation must be made by manually adjusting the sensitivity factors in accordance with the color change of the incoming video signal or the reference color. Such manual adjustment is extremely complicated and requires a skilled technician.

SUMMARY OF THE INVENTION

It is therefore an object of the present invention to provide a chromakey signal producing apparatus which can automatically produce a clear chromakey signal even when the color of an incoming video signal or a set reference color changes or the color of a part of an incoming video signal is similar to the set reference color outside the chromakey area.

A chromakey signal producing apparatus of the present invention includes designating two reference colors as an important feature. The color to be keyed (minimum sensitivity) is set as a first reference color and the color not to be keyed (maximum sensitivity) is set as a second reference color. The clear chromakey signal is automatically produced by discriminating the difference between the first and second reference colors. According to the present invention, even when a part of a TV picture has a color similar to that of the part to be keyed, a clearly discriminated chromakey signal is produced without the need for any complicated sensitivity factor adjustment, simply by designating the color of that particular part as the second reference color corresponding to the maximum sensitivity.

DESCRIPTION OF THE PREFERRED EMBODIMENT

Figure 1:
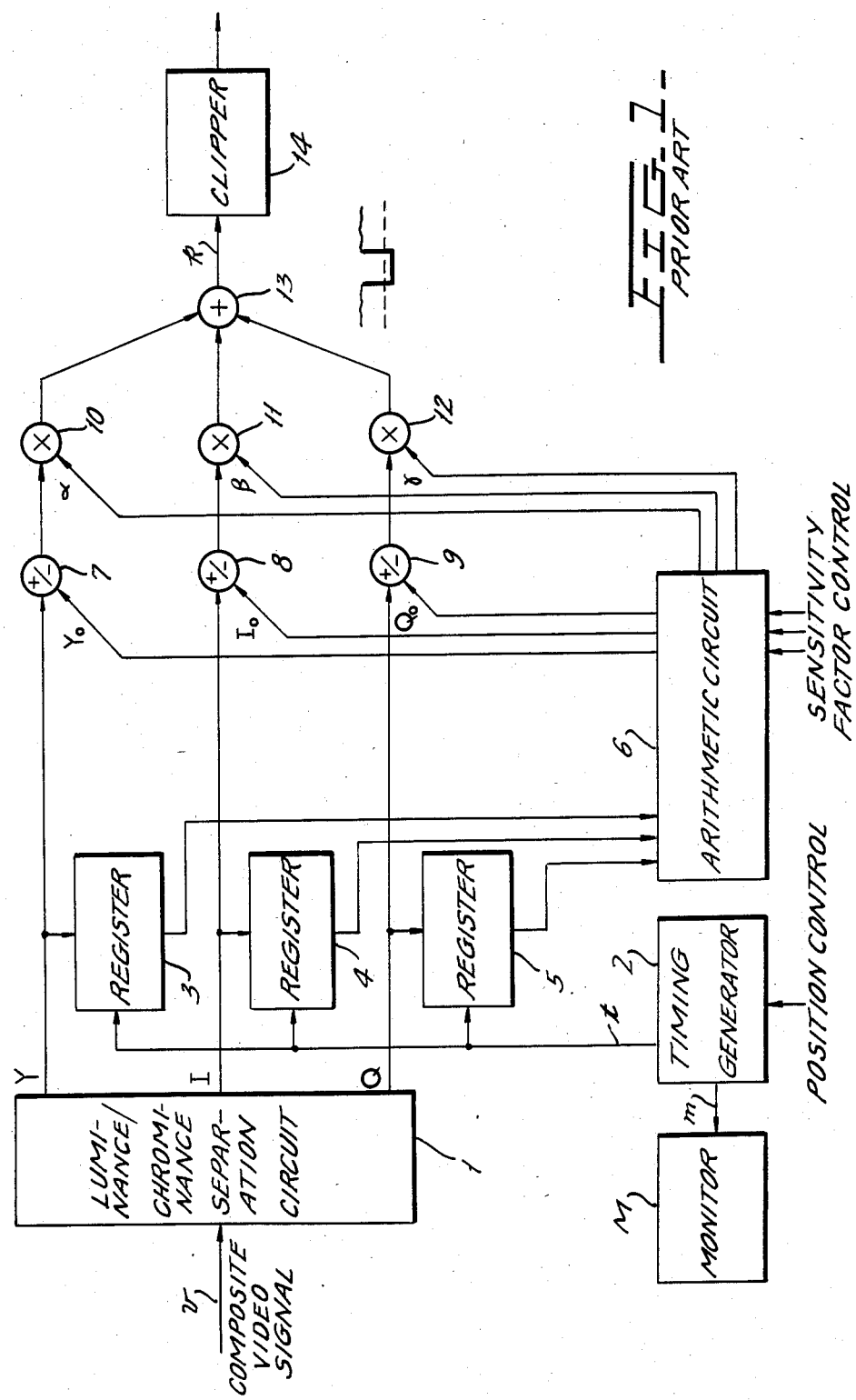
FIG. 1 is a block diagram of the construction of a chromakey signal producing apparatus according to the prior art.

In order to facilitate an understanding of the present invention, a prior-art chromakey signal producing apparatus will be described first with reference to FIG. 1. As shown, a composite digital video signal v is separated into Y, I, and Q components by a luminance-chrominance separation circuit 1. In this case, if sample phases of the digital video signal v coincide with the $\pm I$ and $\pm Q$ axes of a color vector plane, the I, Q and Y components can be easily extracted from the composite digital video signal. A timing generator 2 generates a timing signal t having a certain width corresponding to an arbitrary position within the TV picture and Y, I and Q components are held in registers 3, 4, and 5, respectively, with that timing. A marker signal m is also outputted from the timing generator 2 so that the timing can be confirmed on a monitor. Therefore, any color on the TV picture can be selected as the reference color while the marker is monitored on the monitor picture.

The Y, I, and Q components thus held during the time period defined by the timing signal "t" are averaged by an arithmetic circuit 6 so as to improve the S/N (signal to noise) ratio, and are then sent as reference color components $Y_0$, $I_0$, $Q_0$ to subtractors 7, 8, and 9, respectively. The subtractors 7, 8, and 9 extract respective differences between Y, I, and Q delivered from the luminance-chrominance separation circuit 1 and $Y_0$, $I_0$, and $Q_0$. The extracted differences $(Y-Y_0)$, $(I-I_0)$ and $(Q-Q_0)$ of the corresponding components are multiplied by sensitivity factors $\alpha$, $\beta$, and $\gamma$ in multipliers 10, 11, and 12, respectively, to adjust the sensitivities of each component, and are then added by an adder 13. The result (pre-chromakey signal k) is clipped by a predetermined level in a clipper 14 to produce a chromakey signal. The pre-chromakey signal k delivered from the adder 13 can be expressed by Equation (1) as:

$$k = \alpha|Y-Y_0| + \beta|I-I_0| + \gamma|Q-Q_0| \qquad (1)$$

Since only one reference color, i.e., one set of $Y_0$, $I_0$, and $Q_0$ is designated, as is understood from Equation (1), the pre-chromakey signal k delivered from the adder 13 has a level corresponding to the distance from the reference points $(Y_0, I_0, Q_0)$ on the color space defined by Y, I, and Q axes. As a result, any part on the TV picture having a color similar to the reference color which part should not be keyed cannot be clearly distinguished, and this part is undesirably replaced by another picture by a chromakey effect. In order to avoid this problem it is necessary to adjust the sensitivity factors $\alpha$, $\beta$, and $\gamma$ such that sufficient discrimination can be ensured. These adjustments are very troublesome because they have to be performed manually while observing a monitor picture.

Figure 2:
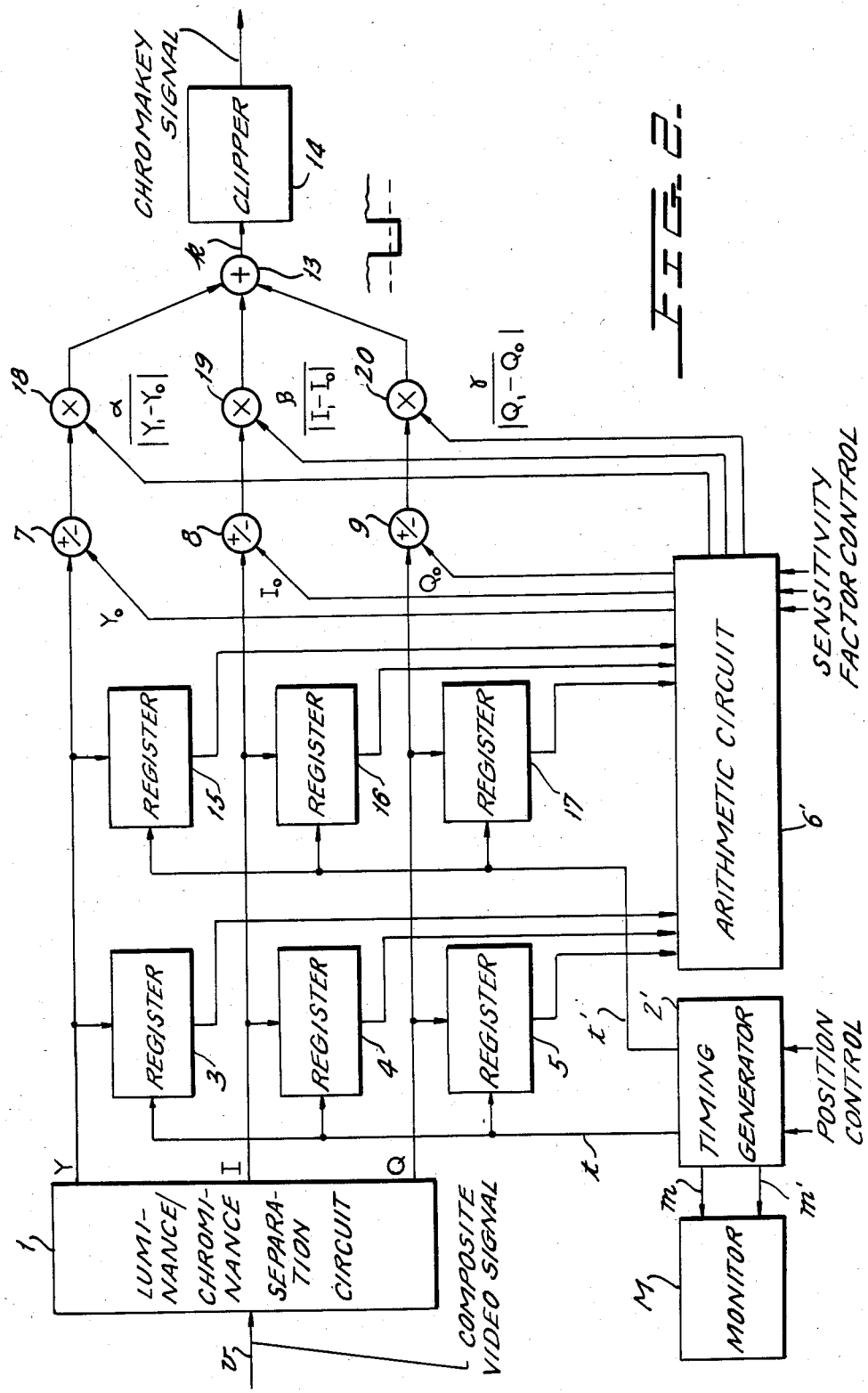
FIG. 2 is a block diagram of an embodiment of the present invention.

Referring now to FIG. 2, the present invention will be described in connection with one possible embodiment thereof. Similar parts of FIG. 2 are indicated by the same numerals as those of FIG. 1. The chromakey signal producing apparatus of the present invention shown in FIG. 2 is different from the prior art apparatus shown in FIG. 1 in that any two positions on the TV picture can be designated as a first reference color to be keyed and a second reference color not to be keyed. The two timing signals which define the positions of the first reference color and the second reference color are generated by a timing generator 2' and indicated by t and t'. Here, the two positions of the first reference color and the second reference color correspond to the minimum sensitivity position and the maximum sensitivity position, respectively.

Similarly to FIG. 1, the Y, I, and Q components during a certain period are held in the registers 3, 4 and 5 at the instant defined by signal t and are sent to an arithmetic circuit 6' for averaging treatment to produce the first reference color (a set of $Y_0$, $I_0$ and $Q_0$). On the other hand, other Y, I, and Q components are held in registers 15, 16, and 17 at the instant defined by signal t' and are sent to the arithmetic circuit 6' to produce the second reference color (a set of $Y_1$, $I_1$ and $Q_1$). The timing generator 2' also generates a first marker signal m indicating a position on a TV picture that is to be keyed and a second marker signal m' indicating positions not to be keyed on the TV picture in response to an externally received control signal. These two marker signals m and m' are sent to a monitor M. Similarly to FIG. 1, differences $(Y-Y_0)$, $(I-I_0)$, and $(Q-Q_0)$ are obtained in the subtractors 7, 8, and 9 and are sent to multipliers 18, 19, and 20, respectively. Also, differences $(Y_1-Y_0)$, $(I_1-I_0)$, and $(Q_1-Q_0)$ are computed in the arithmetic circuit 6', and $\alpha/|Y_1-Y_0|$, $\beta/|I_1-I_0|$, and $\gamma/|Q_1-Q_0|$ are sent to the multipliers 18, 19, and 20. Hence, a output (pre-chromakey signal) delivered from the adder 13 can be expressed by Equation (2) as:

$$\kappa = \alpha \frac{|Y-Y_0|}{|Y_1-Y_0|} + \beta \frac{|I-I_0|}{|I_1-I_0|} + \gamma \frac{|Q-Q_0|}{|Q_1-Q_0|}, \quad (2)$$

In the present invention, as expressed by the Equation (2), the level of the pre-chromakey signal k is automatically compensated by the differences $|Y_1-Y_0|$, $|I_1-I_0|$ and $|Q_1-Q_0|$ to provide a clear chromakey signal. In other words, in accordance with the color difference between the color ($Y_0$, $I_0$ and $Q_0$) to be keyed and the color ($Y_1$, $I_1$, $Q_1$) not to be keyed, the effective sensitivities are changed automatically even if the sensitivity factors $\alpha$, $\beta$, and $\gamma$ are fixed. Therefore, the clear chromakey signal can be obtained even if the color difference between the first and second reference colors is small.

Figure 3:
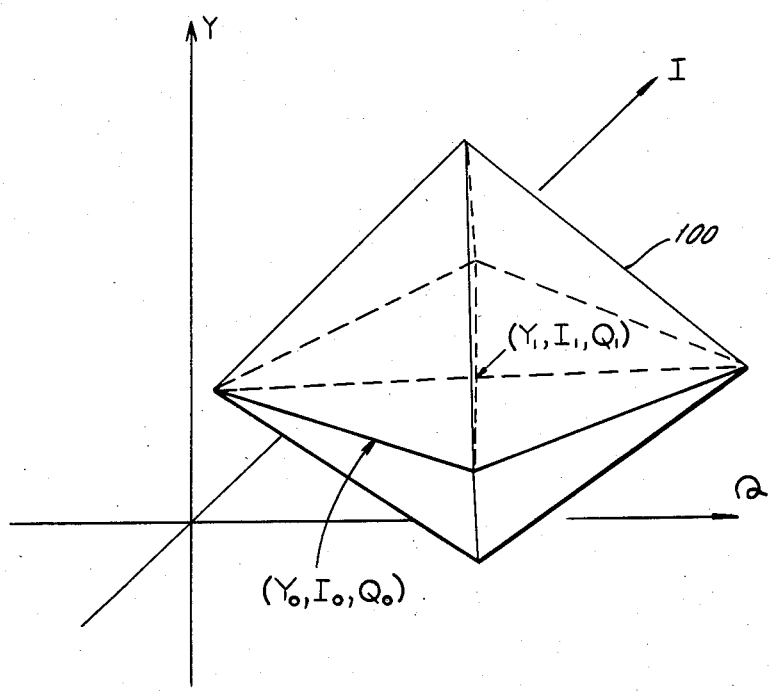
FIG. 3 is a graph illustrating the operation of the chromakey signal producing apparatus shown in FIG. 2.

Next, the chromakey signal produced by the present invention will be described with reference to FIG. 3. Within a three-dimensional vector space (Y, I, and Q axes), the chromakey signal defined by the Equation (2), is illustrated by an octahedron 100 in FIG. 3 after clipping treatment. This octahedron has its center at coordinates ($Y_1$, $I_1$, $Q_1$) and in an outermost face includes a point with coordinates ($Y_0$, $I_0$, $Q_0$). The key signal provides maximum gain at the coordinates ($Y_1$, $I_1$, $Q_1$) and the minimum gain outside the area defined by the coordinates ($Y_0$, $I_0$, $Q_0$).

As described above, the chromakey signal producing apparatus of the present invention enables simple and easy setting of sensitivities for the components indicating luminance (Y) and color hue which may be referred to alternatively as either the chrominance C or its components I and Q, by providing a plurality of reference colors. It is self-explanatory that, by initially setting the sensitivity factors $\alpha$, $\beta$, and $\gamma$ of the Equation (2) at arbitrary levels, it is possible to control a degree of softness or hardness of the chromakey effect, as well as to produce a special key effect such as a luminance key. It is apparent that the present invention should not be basically limited to a NTSC video signal. In the embodiment, a composite video signal has been used as the input signal, but it is apparent that the present invention can be applied with a similar principle to an apparatus using R, G, and B signals from a TV camera.

What is claimed is:

1. A chromakey signal producing apparatus, comprising:

means for extracting Y, I and Q components from an input composite video signal;

means for computing a first difference signal by computing a first difference between at least one of said Y, I and Q components extracted by said extracting means and a corresponding one of Y, I and Q components of a first reference signal; and for computing a second difference between said one of Y, I and Q components of said first reference signal and a corresponding one of Y, I, and Q components of a second reference signal; and means for producing a chromakey signal by controlling the level of said first difference signal in accordance with said second difference.

2. The chromakey signal producing apparatus as claimed in claim 1, in which said first reference signal respresents a color to be keyed and said second reference signal represents a color not to be keyed.

3. The chromakey signal producing apparatus as claimed in claim 1, in which said chromakey signal producing means includes:

means for computing the quotient value of said first difference divided by said second difference; and means for clipping said quotient value according to a predetermined clipping value to produce said chromakey signal.

4. A chromakey signal producing apparatus as claimed in claim 1, further comprising:

means for producing said first reference signal and said second reference signal by holding at least one of said Y, I and Q components extracted from said input composite video signal at the occurrences of a first timing and a second timing, respectively; and means for controlling said first and second timing, respectively.

5. A chromakey signal producing apparatus, comprising:

(a) means for separating Y, I and Q component signals from an input composite video signal; and (b) means for (1) designating a first reference color corresponding to a color to be keyed, said first reference color being indicated by a set of first reference components $Y_0$, and $I_0$ and $Q_0$;

(2) designating a second reference color corresponding to a color not to be keyed, said second reference color being indicated by a set of second reference components $Y_1$, $I_1$ and $Q_1$;

(3) computing a first difference between at least one of said Y, I and Q component signals separated by said separating means and a corresponding one of said first reference components $Y_0$, $I_0$ and $Q_0$ to generate a primary key signal;

(4) computing a second difference between at least one of said first reference components $Y_0$, $I_0$ and $Q_0$ and a corresponding one of said second reference components $Y_1$, $I_1$ and $Q_1$ to generate a compensation level; and (5) producing a chromakey signal by controlling the level of said primary key signal in accordance with said compensation level.

6. A chromakey signal producing apparatus, comprising:

(a) means for separating Y, I and Q component signals from an input composite video signal;

(b) means for generating first and second timing signals corresponding to respective positions on a TV picture screen;

(c) means for (1) extracting components $Y_0$, $I_0$ and $Q_0$ from said Y, I and Q component signals, respectively, at the time of said first timing signal, the set of said components $Y_0$, $I_0$ and $Q_0$ corresponding to a first reference color which is to be keyed;

(2) extracting components $Y_1$, $I_1$ and $Q_1$ from said Y, I and Q component signals, respectively, at the time of said second timing signal, the set of said components $Y_1$, $I_1$ and $Q_1$ corresponding to a second reference color which is not to be keyed;

(3) computing first differences $(Y-Y_0)$, $(I-I_0)$ and $(Q-Q_0)$ between said Y, I and Q component signals and said components $Y_0$, $I_0$ and $Q_0$, respectively;

(4) computing second differences $(Y_1-Y_0)$, $(I_1-I_0)$ and $(Q_1-Q_0)$ between said components $Y_1$, $I_1$ and $Q_1$ and said components $Y_0$, $I_0$ and $Q_0$, respectively;

(5) controlling the levels of said first differences $(Y-Y_0)$, $(I-I_0)$ and $(Q-Q_0)$ in accordance with said second differences $(Y_1-Y_0)$, $(I_1-I_0)$ and $(Q_1-Q_0)$, respectively, to deliver levels $$\alpha \frac{|Y-Y_0|}{|Y_1-Y_0|}, \beta \frac{|I-I_0|}{|I_1-I_0|} \text{ and } \gamma \frac{|Q-Q_0|}{|Q_1-Q_0|}$$

wherein $\alpha$, $\beta$ and $\gamma$ are predetermined constants; and (6) adding said levels $$\alpha \frac{|Y-Y_0|}{|Y_1-Y_0|}, \beta \frac{|I-I_0|}{|I_1-I_0|} \text{ and } \gamma \frac{|Q-Q_0|}{|Q_1-Q_0|}$$

to deliver an added level signal; and (d) means for clipping said added level signal by a predetermined clip level to deliver a chromakey signal.

* * * * *